United States Patent [19]

Schwarz

[11] Patent Number: 5,379,170
[45] Date of Patent: Jan. 3, 1995

[54] DYNAMICALLY ADJUSTABLE HEAD POSITIONING MECHANISM FOR TAPE DRIVES

[75] Inventor: Theodore A. Schwarz, Woodbury, Minn.

[73] Assignee: Minnesota Mining and Manufacturing Company, St. Paul, Minn.

[21] Appl. No.: 190,246

[22] Filed: Jan. 31, 1994

Related U.S. Application Data

[63] Continuation of Ser. No. 867,985, Apr. 13, 1992, abandoned.

[51] Int. Cl.$^6$ .............. G11B 5/584; G11B 5/55; G11B 21/08
[52] U.S. Cl. .................. 360/109; 360/106; 360/77.12; 360/78.02
[58] Field of Search ............. 360/104, 105, 106, 104, 360/78.02, 78.05, 77.12

[56] References Cited

U.S. PATENT DOCUMENTS

| | | | |
|---|---|---|---|
| 3,692,255 | 9/1972 | Von Behren | 242/192 |
| 4,275,427 | 6/1981 | Bjordahl | 360/106 |
| 4,313,143 | 1/1982 | Zarr | 360/106 |
| 4,713,707 | 12/1987 | Heizmann | 360/109 |
| 4,717,978 | 1/1988 | Ichinose | 360/106 |
| 4,750,067 | 6/1988 | Gerfast | 360/106 |
| 4,858,047 | 8/1989 | Cannon et al. | 360/109 |
| 5,166,848 | 11/1992 | Plachy | 360/109 |
| 5,191,492 | 3/1993 | Nayak et al. | 360/78.02 |
| 5,198,947 | 3/1993 | Nayak et al. | 360/109 |

FOREIGN PATENT DOCUMENTS

0148999A1 7/1985 European Pat. Off. .
0243164A3 10/1987 European Pat. Off. .

OTHER PUBLICATIONS

Japanese Patent Abstract No. JP-A-22 49 119, Dec. 1990.

*Primary Examiner*—A. J. Heinz
*Assistant Examiner*—Craig A. Renner
*Attorney, Agent, or Firm*—Gary L. Griswold; Walter N. Kirn; Charles L. Dennis, II

[57] ABSTRACT

A mechanism for accurately positioning a recording/playback head on the center of a track including a stepper motor and coil assembly in combination controlling coarse and fine transverse head position. The coil is attached to a pivoting actuator arm which provides a mounting member for a recording/playback head. A torsion spring is attached to the actuator arm and to a stage which is driven by a stepper motor lead screw to incrementally position the actuator arm. The coil assembly includes a coil bundle juxtaposed between at least two sets of split magnets. The coil assembly operates to pivot the recording/playback head transversely, thereby providing fine position control.

15 Claims, 1 Drawing Sheet

DYNAMICALLY ADJUSTABLE HEAD POSITIONING MECHANISM FOR TAPE DRIVES

This is a continuation of application Ser. No. 07/867,985 filed Apr. 13, 1992, abandoned.

BACKGROUND OF THE INVENTION

1. Field of the Invention

The present invention relates to magnetic tape recorders and to subassemblies utilized therein, particularly with respect to recorders adapted for multiple track recording using a multiple track head which is responsive to servo signals and transversely movable with respect to the recording tape.

2. Description of the Prior Art

Data recording cartridges and recorders adapted for their use are disclosed and claimed in U.S. Pat. No. 3,692,225 (Von Behren). The cartridge there disclosed includes an enclosure together with an endless flexible belt in frictional contact with the tape on both reel hubs for bidirectionally driving the tape. The cartridge can operate to drive the tape with rapid accelerations and decelerations, such as are encountered in digital data recording and playback. Recorders adapted to use such data cartridges originally employed fixed, multitrack heads which were complex, expensive and difficult to maintain in proper alignment.

To eliminate the multitrack heads, U.S. Pat. No. 4,313,143 (Zarr) disclosed a head positioning mechanism by which a single track head could be transversely positioned with respect to the width of the recording tape to enable recording and playback of any of a plurality of parallel tracks.

U.S. Pat. No. 4,750,067 (Gerfast) discloses a head positioning mechanism for a multitrack data cartridge recorder including a stepper motor, a lead screw driven by the stepper motor and a head mounting slide engaged with the lead screw by a partial female thread. The Gerfast mechanism moves a recording/playback head transverse to the path of a magnetic recording tape.

While the Gerfast mechanism works satisfactorily for some applications, a need has recently arisen to provide a mechanism which more accurately positions a magnetic recording head on the center of a selected track in response to servo signals derived from servo information carried on certain tracks on a multitrack tape. This accurate positioning is required to allow substantially higher track densities on recording tape.

The present invention offers a magnetic recording head responsive to such servo signals having the advantage of offering an extremely compact head mechanism. A further advantage of the head mechanism provided by the instant invention is that it is nearly crashproof. The mechanism of the present invention also significantly reduces undesirable translational reactionary resonances which are typically present in prior art head mechanisms.

SUMMARY OF THE INVENTION

In contrast to any of the techniques previously employed, the present invention provides a voice coil and stepper motor head positioning mechanism for a data cartridge recorder which variably positions a recording head transversely with respect to the width of the recording tape. The mechanism of the invention enables head positioning with very close tolerances due to the ability of the voice coil to finely position the head very accurately on the center of a track in response to servo signals carried by the tape.

In one embodiment of the invention the voice coil is attached to a rotating actuator arm. The actuator arm provides a mounting member for a recording/playback head. A torsion spring is attached to the rotating actuator arm and a stage which is driven by a stepper motor lead screw to initially coarsely position the actuator arm. Following coarse positioning by the lead screw, the voice coil then finely positions the head on the center of a selected track. The voice coil includes a coil bundle which is juxtaposed between at least two sets of split magnets. The voice coil and magnets operate together to drive the recording/playback head transversely to the direction of movement of the tape by applying a positioning force.

BRIEF DESCRIPTION OF THE DRAWINGS

The present invention will be more thoroughly described with reference to the accompanying drawings, wherein like numbers refer to like parts in the several views, and wherein.

DETAILED DESCRIPTION OF THE PREFERRED EMBODIMENT

Figure 1:
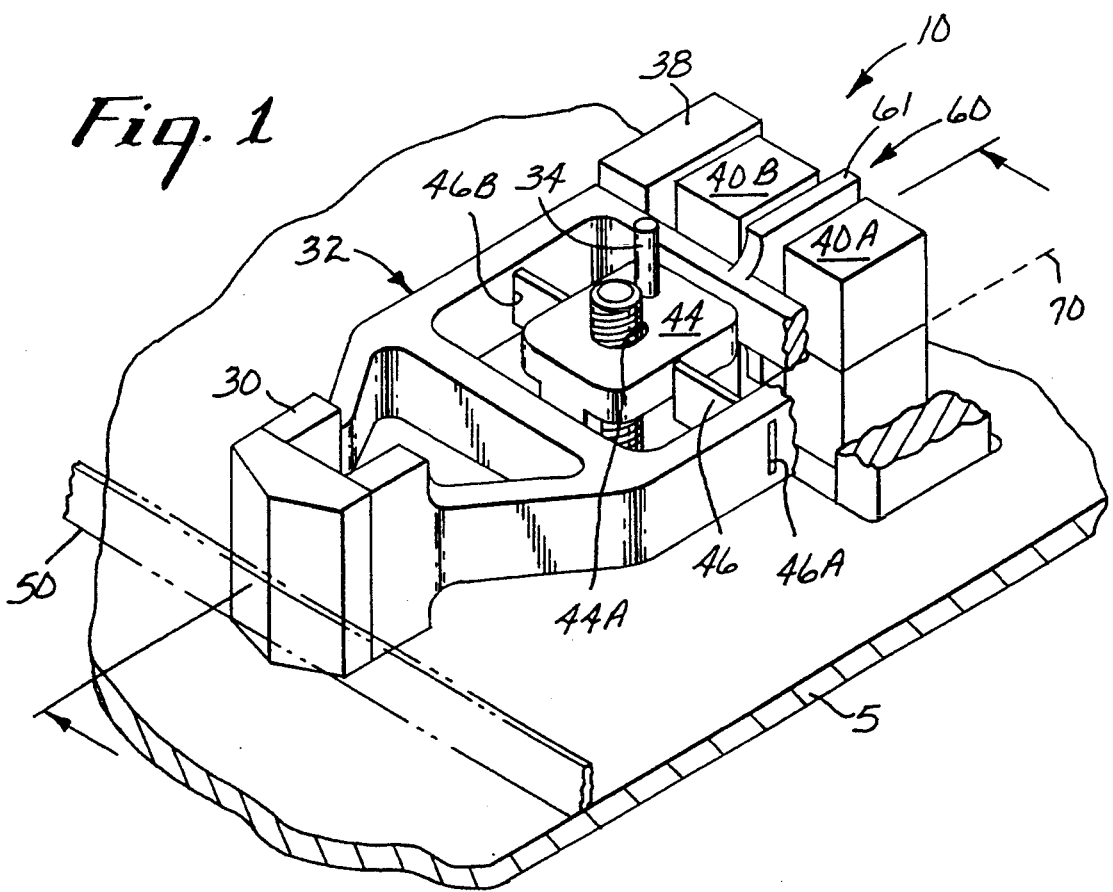
FIG. 1 is an isometric view of one embodiment of the magnetic head assembly of the present invention.
Figure 2A:
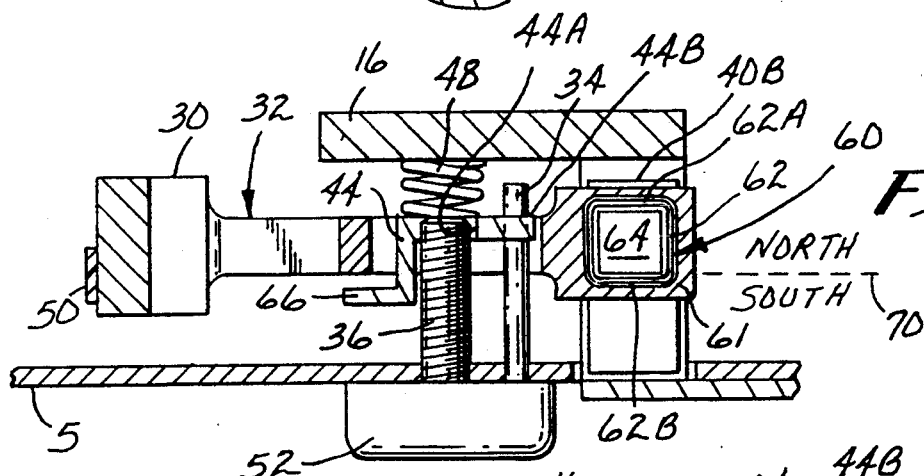
FIG. 2A is a cut away side view of the embodiment of FIG. 1 showing the magnetic head assembly in a fully extended position.
Figure 2B:
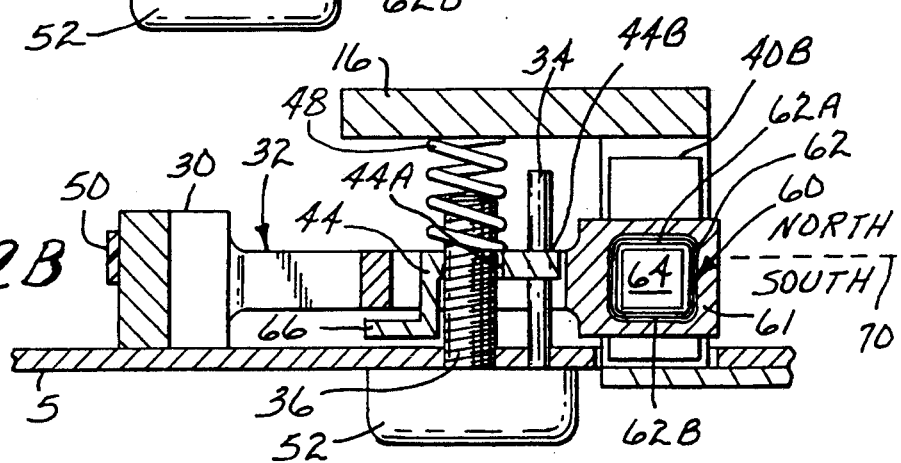
FIG. 2B is a cut away side view of the embodiment of FIG. 1 showing the magnetic head assembly in a bottom position.

Now referring to FIG. 1 which shows an isometric view of one embodiment of the magnetic head assembly of the present invention. As there is seen, the magnetic head assembly 10 includes a rotating actuator arm 32 including a magnetic recording head assembly 30 rigidly affixed thereto. A stepper motor 52, such as is shown in FIGS. 2A and 2B, drives a lead screw 36 which, in turn moves the stage 44 in a vertical direction perpendicular to the surface of a base 5. A coil assembly 60 is attached to one end of the rotating actuator arm 32. As best shown in the side cut-away view FIG. 2A, the coil assembly 60 comprises a coil frame 61, a coil 62 and a mandrel 64. The coil 62 comprises an upper portion 62A and a lower portion 62B. A recording tape 50 having data contained on a multiplicity of parallel tracks moves along a transport path across the head assembly 30.

The head mounting assembly 10 further includes a stage 44 having a bottom surface affixed to a torsion spring 46 which traverses the width of the rotating actuator arm 32. Torsion spring 46 is rigidly coupled at its ends 46A, 46B to opposing sides of the rotating actuator arm 32. The stage 44 includes apertures 44A and 44B which are sized to receive the lead screw 36 and an anti-rotation pin 34. Aperture 44A may advantageously be a half-nut aperture, slightly larger than necessary to accommodate the lead screw 36 so as to allow for movement of the actuating arm 32 in a direction normal to the plane of the tape to assure constant loading at the tape head interface. The aperture 44A is constructed to also allow pivotal movement of the magnetic head assembly. The pin 34 and the lead screw 36 are affixed in a well-known manner to a stepper motor 52. The pin 34 allows movement of the stage 44 in a direction perpendicular to the surface of the base 5 but minimizes rotation or movement in other directions. The stepper motor 52 turns the lead screw in response to control signals applied using well-known techniques.

Referring to FIGS. 1 and 2A, a magnet housing 38, advantageously in the form of a metal U-shaped frame, is rigidly mounted to the fixed base 5. The magnet housing 38 is preferably substantially comprised of steel material. Magnets 40A and 40B are rigidly affixed to facing sides of the magnet housing using epoxy, for example. Magnets 40A and 40B may preferably be comprised of split magnets having, for example, a top portion being a north pole and a bottom portion being a south pole whose heights are equal or greater than the stepper motor translational distance plus the width of the coil bundle. The north and south poles of each magnet may be advantageously split at the approximate center of the vertical height of the magnets as indicated by broken line 70. The magnet housing 38 is mounted to the baseplate, as is the stepper motor 52. The U-shaped steel housing serves as a return path for the magnetic flux. The magnet housing is also used to stiffen the baseplate in the region wherein it is mounted. The base 5 is cut out in the region of the assembly to allow installation and movement of the assembly. Coil assembly 60 is movably juxtaposed between the magnets 40A and 40B so as to allow pivotal movement of the frame and, consequently, the entire magnetic head assembly transversely to the direction of motion of the magnetic tape as the tape moves across the head assembly 30.

Now referring particularly to FIG. 2A, a cut-away side view of the example of the invention illustrated in FIG. 1 is shown wherein the magnetic head assembly 10 is in a raised position relative to the tape 50. A load spring 48 is retained between the housing 16 and the stage 44. The lead screw 36 may advantageously be positioned within the load spring 48 which may advantageously comprise a compliant coil spring having a sufficiently large opening in to accommodate the lead screw 36.

In operation, the stepper motor 52 is used to coarsely position the head from track to track and the voice coil responds to a servo signal in a track following mode to make extremely small adjustments, as for example, within microinches or micrometers, to follow the center of the selected track. The torsion spring and voice coil design give the mechanism of the invention the ability to dynamically track the servo signal. Higher track density data cartridges are now made technically feasible as compared with conventional methods found in the prior art.

The stepper drives the stage 44 through the lead screw 36 which provides for substantially zero backlash with slight interference. The stage is heavily loaded, the loading approaching the lifting capacity of the stepper and lead screw. Loading is achieved by the compression spring 48 to prevent movement of the stage or lead screw after locking into position and to minimize resonance from this portion of the mechanism. The rotating actuator arm 32 is attached to the stage 44 by the torsion spring to eliminate any translational movement during rotation. In one embodiment of the invention, the torsion spring holds the arm several mils above the stage.

For some applications, a stop 66 is advantageously employed. The stop 66 may advantageously be, for example, an "L-shaped" member which extends from a portion of the stage 44 under and in proximity to the cross member of arm 32. Stop 66 serves as a crash stop and limits the motion of the arm to a few minutes of rotation in a direction substantially transverse to the direction of movement of the tape 50. An electrical current of sufficient magnitude, herein called a head location signal, may be applied in a well known manner to coil 62 in order to drive the cross member of arm 32 against the crash stop 66. The head location signal may be applied to the coil 62 in order to lock the head assembly 30 against the crash stop 66, thereby holding the head assembly 30 in a fixed position relative to the stage 44. In this way the position of the head assembly may be located in the absence of a servo signal on the tape. Alternatively, if the magnetic head assembly of the invention is used in a stepper mode only configuration, that is a configuration that does not use track following servo signals, the crash stop 66 provides protection against vibration and shock. Those skilled in the art will recognize that variations of the embodiment shown are readily ascertainable, such as employing multiple crash stops extending from the stage, and the invention is not to be considered as to be limited by the example discussed herein.

The forward portion of the arm 32 is a simple rigid box terminated in a frame which secures the head. In the implementation shown, the arm height is less than its length to allow the moving mechanism to translate about 150 mils to access all tape tracks, yet allow the entire assembly to fit nominally within a 1.0 inch height profile. The rear portion of the arm 32 holds the coil. The minimum separation of the inner turn of the upper and lower portion of the coil is about 250 mils to allow the coil to be operated at full power whether the mechanism is at the bottom position or the fully extended position. The length of the coil is determined by the force required to rotate or pivot the actuator properly at the desired frequency and acceleration. The coil is wrapped around and bonded to a mandrel 64 which is epoxied into a frame at the rear of the arm, forming a rigid body. The mandrel is weighted to balance the rotating arm about its axis, reducing translational reactionary forces.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. In a tape drive adapted for recording and playing back data from any one of a plurality of parallel data tracks extending along a length of magnetic recording tape, in which the tape drive includes a housing and in which at least one recording/playback head is adapted to interface with the tape along a tape transport path and to be variably positioned transversely with respect to the tape length, a head positioning mechanism comprising:

a. a base;
   b. linear support means secured to the base generally parallel with the plane of the recording tape along the transport path;
   c. actuating arm means rigidly attached to said at least one head for supporting said head;

d. a coarse positioning means for coarsely positioning said at least one head in a selected coarse track position in relation to a selected one of the plurality of parallel data tracks, wherein the coarse positioning means includes a stage slideably engaged to the linear support means;

e. means for pivotally mounting the actuating arm means to the stage and for providing torsional force to maintain the actuating arm means at a center position normal to the tape transport path while eliminating any transverse movement during pivoting of the actuating arm means, wherein the pivotal mounting means is secured to the stage and has first and second ends individually affixed to respective opposing sides of the actuating arm means;

f. means attached to the actuating arm means for finely positioning said at least one head in relation to the center of a selected data track; and g. means for allowing movement of the actuating arm means relative to the base in a direction normal to the plane of the tape to assure constant loading at the tape head interface.

2. A head positioning mechanism according to claim 1 wherein the coarse positioning means further comprises means for incrementally driving the coarse positioning means including:

a. a stepper motor secured to the base relative to the tape transport path and having a drive shaft rotatably mounted therein; and b. wherein the drive shaft of the stepper motor engages the stage to convert rotary motion of the shaft into a corresponding linear movement of the stage.

3. A head positioning mechanism according to claim 1, wherein the movement allowing means comprises the pivotal mounting means which to allow both the pivotal and normal directional movement.

4. A head positioning mechanism according to claim 1, wherein the actuating arm means is constructed so as to be balanced about the pivotal mounting means.

5. A head positioning mechanism according to claim 1 wherein the fine positioning means comprises a coil assembly, including a coil bundle attached to the actuating arm means and means for applying a magnetic force to the coil bundle, the coil bundle and the magnetic force means operating to drive the recording/playback head transversely to the direction of movement of the tape in response to a position signal applied to the coil bundle.

6. A head positioning mechanism according to claim 5 further comprising load spring means affixed between the housing and the coarse positioning means for biasing the coarse positioning means to maintain said at least one head in the selected coarse track position.

7. A head positioning mechanism according to claim 5, the magnetic force means comprising at least two sets of split magnets having the coil bundle juxtaposed therebetween, and wherein the stage further comprises a stop member which extends from a portion of the stage under and in proximity to a portion of the actuating arm means, wherein the stop member is positioned so as to lock said at least one head in a fixed position relative to the stage in response to the application of a head location signal to the coil bundle.

8. A head positioning mechanism according to claim 7 wherein the stage is mounted to the linear support means to allow the actuating arm means to be transversely moved between a bottom-most and a top-most position and wherein the coil bundle is positioned to have a top portion thereof located within the field of the top portion of the split magnets and to have a bottom portion within the field of the bottom portion of the split magnets, regardless of whether the actuating arm means is in the bottom-most or top-most position.

9. A head positioning mechanism according to claim 7 wherein the at least two sets of split magnets of the magnetic force applying means comprise two pairs of north-south split magnets, each pair of the north-south split magnets being located on a respective side of the coil bundle, wherein each magnet is split into a top portion having a first polarity and a bottom portion having a second, opposite polarity.

10. A head positioning mechanism according to claim 9 wherein the at least two sets of split magnets are enclosed in a substantially U-shaped housing serving as a return path for magnetic flux.

11. In a tape drive adapted for recording on and playing back data from any one of a plurality of parallel tracks extending the length of a recording tape, in which the tape drive includes a housing and in which at least one recording/playback head is adapted to interface with the tape along a tape transport path and to be variably positioned transversely with respect to the tape, a head positioning mechanism comprising:

a. a base;

b. a frame including a head mounting member for attaching the recording/playback head, and further comprising first and second opposing arms;

c. first and second torsion springs having opposing ends wherein one end of each of the first and second torsion springs are secured to the first and second opposing arms, respectively;

d. a coarse positioning means mounted on the base for coarsely positioning said at least one head in a selected coarse track position in relation to a selected one of the plurality of parallel tracks, wherein the coarse positioning means includes linear support means secured generally perpendicularly to the direction of motion of the recording tape and a stage slideably engaged to the linear support means, wherein the other ends of the first and second torsion springs are individually attached to respective opposite sides of the stage, and wherein the torsion springs apply a force substantially transversely to the direction of movement of the tape;

e. load spring means affixed between the housing and the coarse positioning means to maintain said at least one head in the selected coarse track position;

f. means for finely positioning said at least one head in relation to the center of a selected parallel track wherein the fine positioning means comprises a voice coil assembly mounted on the frame, the voice coil assembly including a voice coil;

g. means mounted on the base for applying a magnetic force to the voice coil, the magnetic force means comprising at least two sets of split magnets having the voice coil juxtaposed therebetween, the voice coil and the magnetic force means operating to drive the recording/playback head transversely to the direction of movement of the tape by applying a positioning force; and h. means for allowing movement of the frame relative to the base in a direction normal to the plane of the tape to assure constant loading at the tape head interface.

12. A head positioning mechanism according to claim 11 wherein said voice coil assembly includes a coil bundle attached to said frame, the coil bundle being juxtaposed between said at least two sets of split magnets, the coil bundle and the magnetic force means operating to drive the recording/playback head transversely to the direction of movement of the tape in response to a position signal applied to the coil bundle.

13. A head positioning mechanism according to claim 11 wherein the coarse positioning means further comprises means for incrementally driving the coarse positioning means including:
 a. a stepper motor secured to the base relative to the tape transport path and having a drive shaft rotatably mounted therein; and
 b. wherein the drive shaft of the stepper motor engages the stage to convert rotary motion of the shaft into corresponding linear movement of the frame.

14. A head positioning mechanism according to claim 13 wherein the voice coil assembly comprises a coil bundle attached to the first and second opposing arms, and wherein the at least two sets of split magnets of the magnetic force applying means comprises two pairs of split magnets, each pair of the split magnets being located on a respective side of the coil bundle, wherein each magnet is split into a top portion having a first polarity and a bottom portion having a second, opposite polarity.

15. A head positioning mechanism according to claim 14 wherein the at least two sets of split magnets are enclosed in a substantially U-shaped housing serving as a return path for magnetic flux.

* * * * *

UNITED STATES PATENT AND TRADEMARK OFFICE
CERTIFICATE OF CORRECTION

PATENT NO.: 5,379,170

DATED: January 3, 1995

INVENTOR(S): Schwarz

It is certified that error appears in the above-identified patent and that said Letters Patent is hereby corrected as shown below:

Col. 5, line 37, "which to allow" should be --which allows--.

Signed and Sealed this

Twentieth Day of June, 1995

Attest:

BRUCE LEHMAN

Attesting Officer     Commissioner of Patents and Trademarks